(12) United States Patent
Yokoi et al.

(10) Patent No.: US 10,023,119 B2
(45) Date of Patent: Jul. 17, 2018

(54) ALERT CONTROL APPARATUS

(71) Applicant: DENSO CORPORATION, Kariya, Aichi-pref. (JP)

(72) Inventors: Yuusuke Yokoi, Kariya (JP); Takashi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 95 days.

(21) Appl. No.: 15/152,993

(22) Filed: May 12, 2016

(65) Prior Publication Data

US 2016/0332571 A1  Nov. 17, 2016

(30) Foreign Application Priority Data

May 14, 2015 (JP) .................................. 2015-099046

(51) Int. Cl.
*B60Q 9/00* (2006.01)
*B60T 8/1755* (2006.01)

(52) U.S. Cl.
CPC .......... *B60Q 9/008* (2013.01); *B60T 8/17558* (2013.01); *B60T 2201/024* (2013.01)

(58) Field of Classification Search
CPC ................. B60Q 9/008; B60T 8/17558; B60T 2201/024
See application file for complete search history.

(56) References Cited

U.S. PATENT DOCUMENTS

| 6,265,990 B1 | 7/2001 | Isogai et al. | |
| 8,146,703 B2 * | 4/2012 | Baumann | B60R 21/0132 180/275 |
| 2004/0199327 A1 * | 10/2004 | Isogai | B60K 31/0008 701/301 |
| 2005/0236895 A1 * | 10/2005 | Matsumoto | B60T 8/17557 303/140 |
| 2005/0267660 A1 * | 12/2005 | Fujiwara | B60T 8/17558 701/41 |

(Continued)

FOREIGN PATENT DOCUMENTS

| JP | 2006-315489 | 11/2006 |
| JP | 2007-038954 A | 2/2007 |

(Continued)

*Primary Examiner* — Calvin Cheung
(74) *Attorney, Agent, or Firm* — Knobbe, Martens, Olson & Bear, LLP

(57) ABSTRACT

In an alert control apparatus mounted in a vehicle, when collision avoidance control is being performed to automatically activate brakes of the vehicle to avoid collision with a forward object, an alert determiner determines whether or not a predefined alert condition for determining that the collision with the forward object cannot be avoided is met, based on a distance to the forward object and a stopping distance. The stopping distance is a distance the vehicle travels until the vehicle stops moving and is calculated based on the traveling speed of the vehicle and a collision avoidance deceleration at which the traveling speed is decreased under the collision avoidance control. An alert controller, if the alert condition is met, activates at least one alerting device to alert surroundings of the vehicle, and if the alert condition is not met, inhibits operation of the at least one alerting device.

9 Claims, 4 Drawing Sheets

(56) References Cited

U.S. PATENT DOCUMENTS

| | | | | |
|---|---|---|---|---|
| 2007/0032914 A1* | 2/2007 | Kondoh | ............... | B60W 50/16 |
| | | | | 701/1 |
| 2007/0192030 A1* | 8/2007 | Tanimichi | ............. | B60W 10/18 |
| | | | | 701/301 |
| 2008/0046145 A1* | 2/2008 | Weaver | .................... | B60T 7/22 |
| | | | | 701/41 |
| 2008/0300788 A1* | 12/2008 | Kanaboshi | ......... | B62D 15/0265 |
| | | | | 701/301 |
| 2008/0312834 A1* | 12/2008 | Noda | ...................... | B60T 7/22 |
| | | | | 701/301 |
| 2009/0150034 A1* | 6/2009 | Ezoe | ....................... | B60T 7/12 |
| | | | | 701/53 |
| 2009/0326820 A1* | 12/2009 | Shimizu | .................. | B60T 7/22 |
| | | | | 701/301 |
| 2010/0211235 A1* | 8/2010 | Taguchi | ................... | B60T 7/22 |
| | | | | 701/1 |
| 2014/0324287 A1* | 10/2014 | Tsuchida | ............. | B60W 10/184 |
| | | | | 701/36 |
| 2014/0350815 A1* | 11/2014 | Kambe | .................... | B60T 7/22 |
| | | | | 701/70 |
| 2015/0274145 A1* | 10/2015 | Ando | ........................ | B60T 7/22 |
| | | | | 701/70 |

FOREIGN PATENT DOCUMENTS

| | | |
|---|---|---|
| JP | 2007-091028 A | 4/2007 |
| JP | 2014-008814 | 1/2014 |

\* cited by examiner

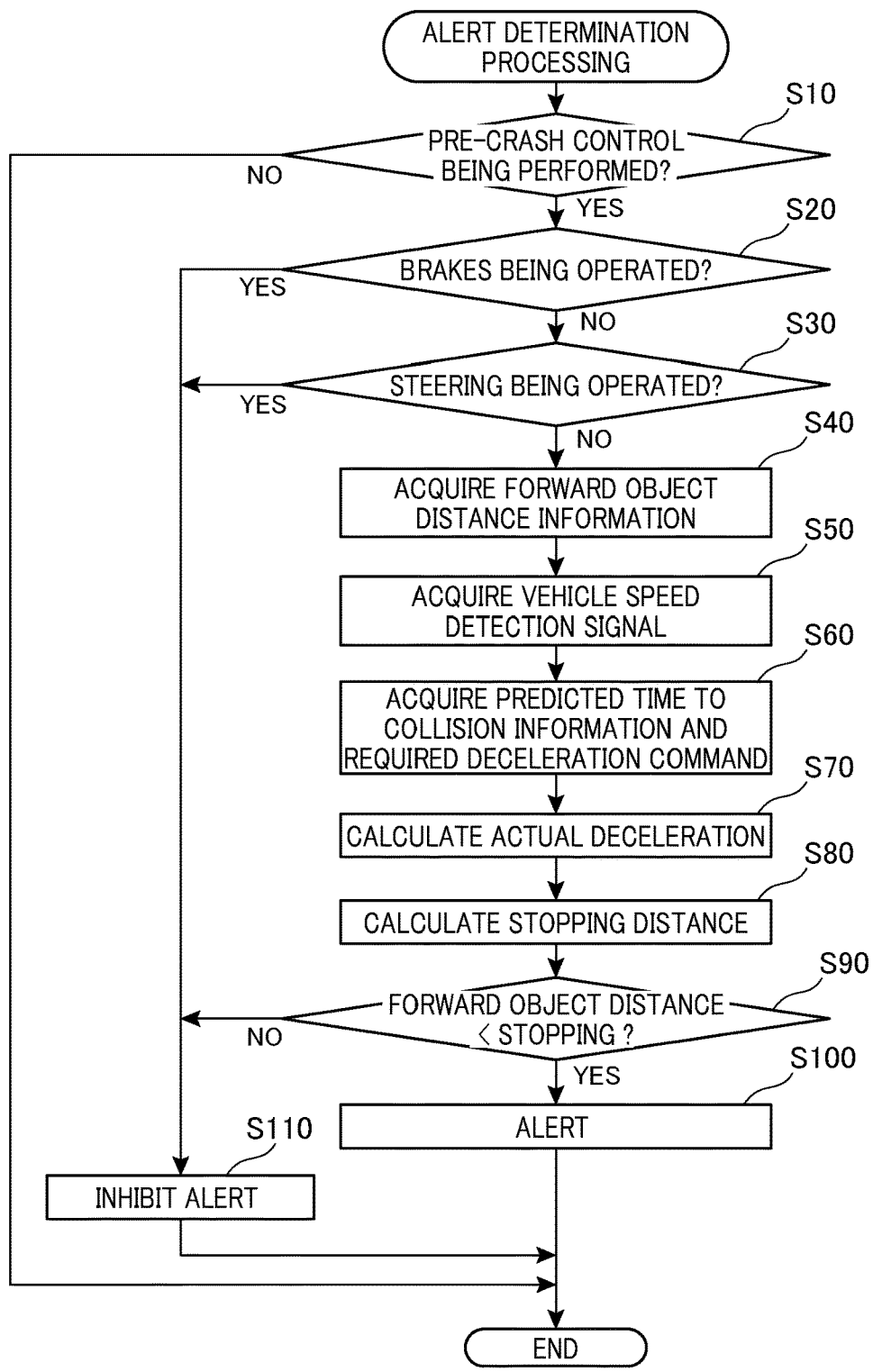

ALERT CONTROL APPARATUS

CROSS-REFERENCE TO RELATED APPLICATION

This application is based on and claims the benefit of priority from earlier Japanese Patent Application No. 2015-99046 filed May 14, 2015, the description of which is incorporated herein by reference.

BACKGROUND

Technical Field

The present invention relates to an alert control apparatus for controlling an alert to surroundings of a vehicle carrying the apparatus.

Related Art

Conventionally, a system is known that is configured to, upon detecting an obstacle likely to collide with a vehicle carrying the system (hereinafter referred to as an own vehicle), not only warn a vehicle's driver, but also alert surroundings of the own vehicle. Such a system can prevent the own vehicle from colliding with the obstacle or can prevent other vehicles and pedestrians around the own vehicle from being secondarily affected by an operation performed by the own vehicle to avoid the collision with the obstacle.

Such a system is known as configured to raise an alert at times and in manners depending on environments around the own vehicle (e.g., snowfall, rainfall, and evening hours) (see, for example, Japanese Patent Application Laid-Open Publication No. 2007-38954).

The technique disclosed in Japanese Patent Application Laid-Open Publication No. 2007-38954, however, may unnecessarily raise the alert even if the collision with the obstacle can be avoided by driver's steering or automated braking.

In consideration of the foregoing, exemplary embodiments of the present invention are directed to providing techniques for preventing unnecessarily raising the alert even if the collision with the obstacle can be avoided.

SUMMARY

In accordance with an exemplary embodiment of the present invention, there is provided an alert control apparatus mounted in a vehicle including an avoidance control determiner, a distance information acquirer, a vehicle speed information acquirer, a stopping distance calculator, an alert determiner, and an alert controller.

The avoidance control determiner is configured to determine whether or not collision avoidance control is being performed to automatically activate brakes of the vehicle to avoid collision between the vehicle and a forward object that is an object located forward of the vehicle during traveling of the vehicle.

The distance information acquirer is configured to acquire forward object distance information that is information indicative of a distance between the vehicle and the forward object. The vehicle speed information acquirer is configured to acquire vehicle speed information that is information indicative a traveling speed of the vehicle.

The stopping distance calculator is configured to, if it is determined by the avoidance control determiner that the collision avoidance control is being performed, calculate a stopping distance based on at least the traveling speed of the vehicle indicated by the vehicle speed information acquired by the vehicle speed information acquirer and a collision avoidance deceleration that is a deceleration at which the traveling speed of the vehicle is decreased under the collision avoidance control, where the stopping distance is a distance the vehicle travels until the vehicle stops moving.

The alert determiner is configured to, based on at least the distance to the forward object indicated by the forward object distance information acquired by the distance information acquirer and the stopping distance calculated by the stopping distance calculator, determine whether or not a predefined alert condition is met, where the predefined alert condition is such that, if the condition is met, the collision between the vehicle and the forward object cannot be avoided.

The alert controller is configured to, if it is determined by the alert determiner that the alert condition is met, activate at least one alerting device operative to alert surroundings of the vehicle, and if it is determined by the alert determiner that the alert condition is not met, inhibit operation of the at least one alerting device.

With this configuration, if the alert control apparatus determines that the collision between the vehicle and the forward object can be avoided taking into account the required deceleration under the collision avoidance control to automatically activate the brakes of the vehicle to avoid collision between the vehicle and the forward object, the alert control apparatus inhibits operation of the at least one alerting device. This can prevent unnecessarily raising the alert even if the collision between the own vehicle and the forward object can be avoided.

BRIEF DESCRIPTION OF THE DRAWINGS

FIG. 2 is a flowchart of alert determination processing; and

DESCRIPTION OF SPECIFIC EMBODIMENTS

Figure 1A:
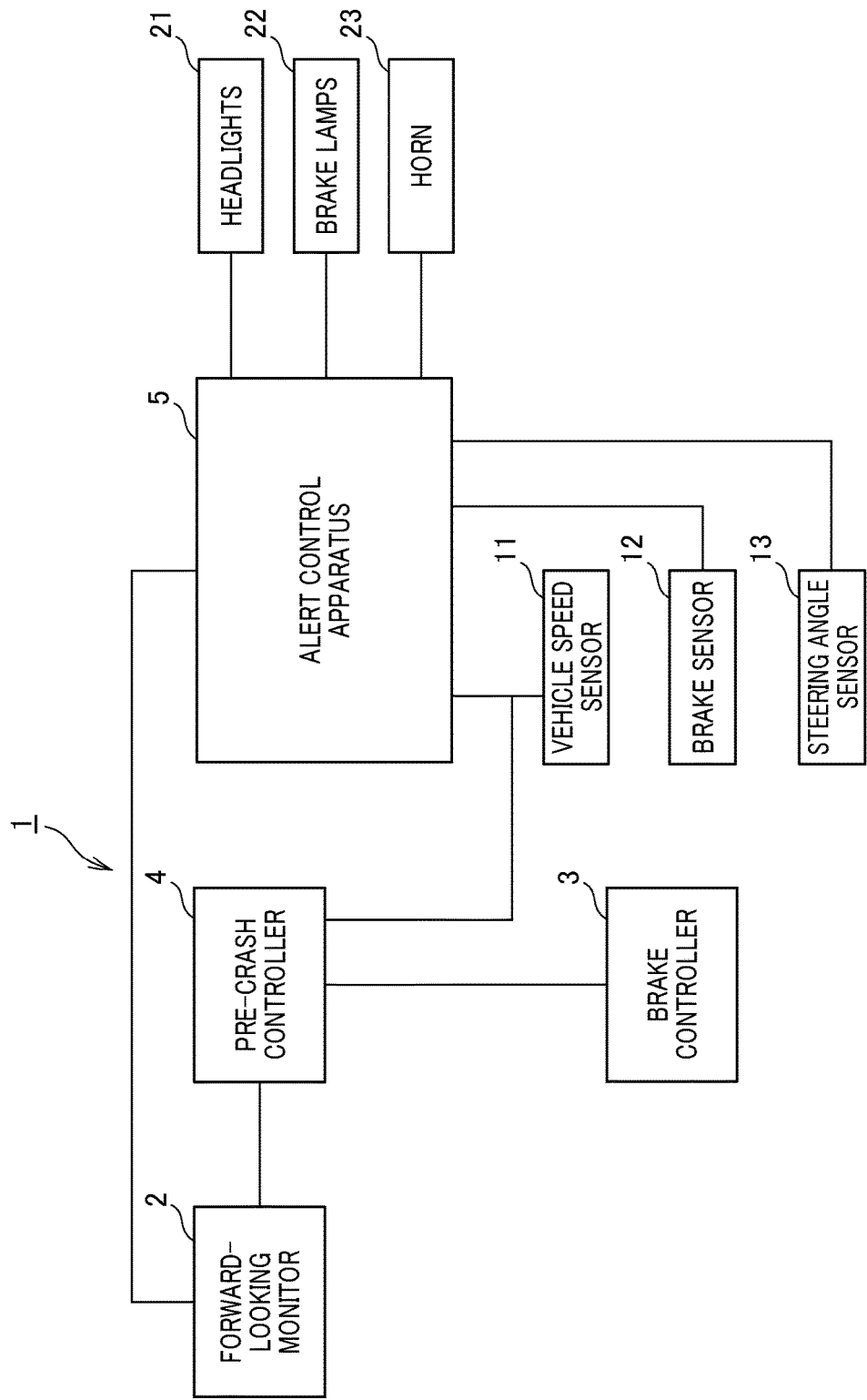
FIG. 1A is a block diagram of a pre-crash safety system in accordance with one embodiment of the present invention.

The present invention will be described more fully hereinafter with reference to the accompanying drawings. A pre-crash safety system 1 is mounted in a vehicle and includes, as shown in FIG. 1A, a forward-looking monitor 2, a brake controller 3, a pre-crash controller 4, and an alert control apparatus 5. The vehicle carrying the pre-crash safety system 1 is hereinafter referred to as an own vehicle.

The forward-looking monitor 2 is configured to transmit radar waves in a forward direction of the own vehicle and receive reflected radar waves to thereby detect a distance to an object located forward of the own vehicle. The forward-looking monitor 2 is further configured to transmit forward object distance information that is information indicative of the distance to the object located forward of the own vehicle.

The brake controller 3 is configured to drive a brake actuator (not shown) according to a required-deceleration command (described later) outputted from the pre-crash controller 4 to thereby control an own-vehicle braking force.

The pre-crash controller 4 is configured to predict a time to collision (TTC) based on the forward object distance information transmitted from the forward-looking monitor 2 and a vehicle speed detection signal outputted from the vehicle-speed sensor 11 operative to detect a traveling speed of the own vehicle, and others. The pre-crash controller 4 is configured to, if the predicted time to collision TTC is less than a predetermined brake control determination value, transmit to the brake controller 3 the required-deceleration command indicative of a deceleration that is preset as a function of the predicted time to collision TTC to thereby increase the own-vehicle braking force. The pre-crash controller 4 is further configured to, if the predicted time to collision TTC is less than the brake control determination value, transmit to the alert control apparatus 5 pre-crash control information that indicates that the pre-crash control is being performed, predicted time-to-collision information indicative of the predicted time to collision TTC, and the required-deceleration command.

The alert control apparatus 5 is configured as a well-known microcomputer including a central processing unit (CPU), a random access memory (RAM), a read only memory (ROM), an input/output interface, and a bus line connecting these components. Various processing algorithms including the alert determination processing (described later) are implemented by the CPU executing computer programs stored in the ROM.

The alert control apparatus 5 is configured to acquire the vehicle speed detection signal from the vehicle speed sensor 11, a brake depression amount detection signal from a brake sensor 12 operative to detect a brake depression amount during driver's brake pedal operation, and a steering angle detection signal from a steering angle sensor 13 operative to detect a steering angle of vehicle front wheels during driver's steering operation.

The alert control apparatus 5 is configured to control illumination of the headlights 21 and illumination of the brake lamps 22, and sounding of the horn 23. The headlights 21, the brake lamps 22, and the horn 23 are alerting devices in the present embodiment. The alert control apparatus 5 performs alert determination processing. The alert determination processing is performed every predetermined time interval (e.g., every 32 milliseconds) during operation of the alert control apparatus 5.

Figure 1B:
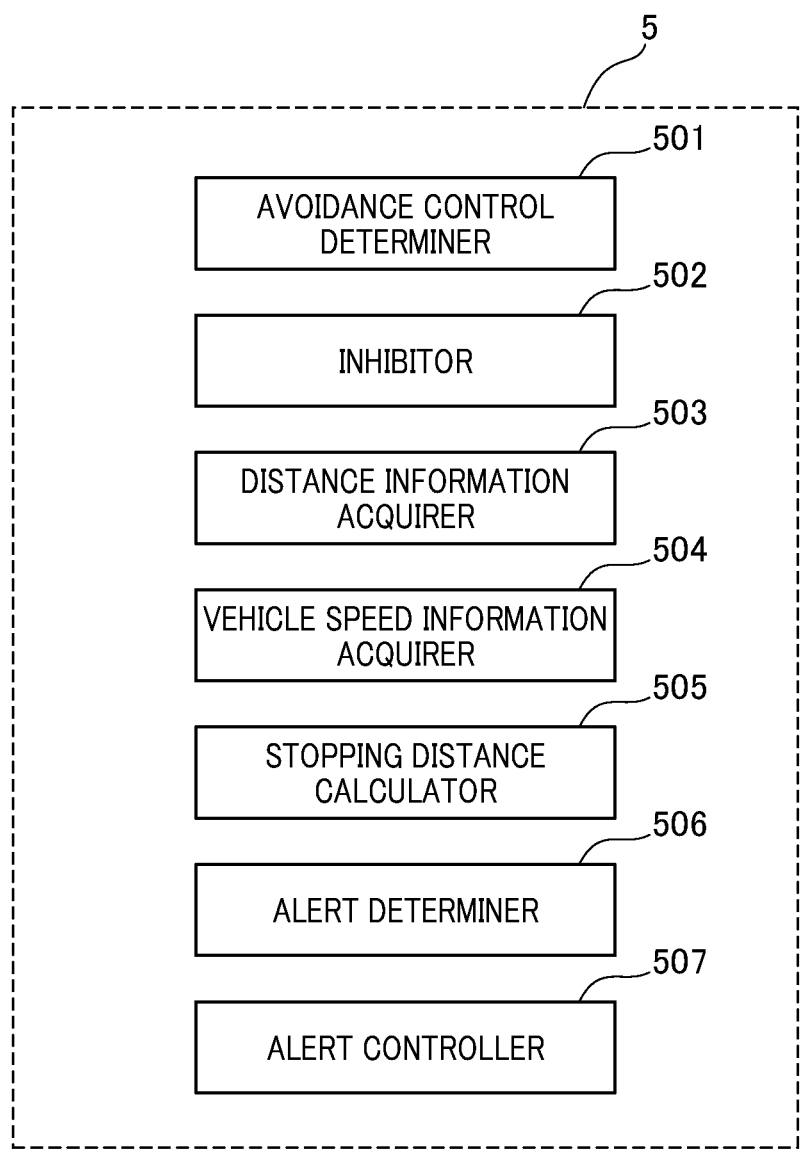
FIG. 1B is a functional block diagram of an alert control apparatus shown in FIG. 1A.

As shown in FIG. 1B, the alert control apparatus 5 includes, as functional blocks to perform the alert determination processing, an avoidance control determiner 501, an inhibitor 502, a distance information acquirer 503, a vehicle speed information acquirer 504, a stopping distance calculator 505, an alert determiner 506, and an alert controller 507. As mentioned above, functions of these blocks may be implemented by the CPU of the alert control apparatus 5 executing computer programs sored in the ROM.

As shown in FIG. 2, when the alert determination processing is launched, the avoidance control determiner 501, in step S10, determines whether or not the pre-crash control is being performed. More specifically, upon receipt of the pre-crash control information from the pre-crash controller 4, the avoidance control determiner 501 determines that the pre-crash control is being performed. If in step S10 it is determined that the pre-crash control is not being performed, then the process flow ends. If in step S10 it is determined that the pre-crash control is being performed, then in step S20 the inhibitor 502 determines whether or not own-vehicle's brakes are being operated or manipulated based on the brake depression amount detection signal from the brake sensor 12.

If in step S20 it is determined that the own-vehicle's brakes are being operated, then the process flow proceeds to step S110. If in step S20 it is determined that the own-vehicle's brakes are not being operated, then in step S30 the inhibitor 502 determines whether or not the own-vehicle's steering is being operated or manipulated based on the steering angle detection signal from the steering angle sensor 13.

If in step S30 it is determined that the own-vehicle's steering is being operated, then the process flow proceeds to step S110.

If in step S20 it is determined that the own-vehicle's brakes are being operated or if in step S30 it is determined that the own-vehicle's steering is being operated, then in step S110 the inhibitor 502 turns off the headlights 21 and the brake lamps 22 if the headlights 21 and the brake lamps 22 are illuminating and turns off the horn 23 if the horn 23 is sounding, thereby inhibiting alerting the surroundings of the own vehicle. In addition, in step S110, the inhibitor 502 takes no action if none of the headlights 21 and the brake lamps 22 are illuminating and if the horn 23 is not sounding. Thereafter, the process flow ends.

If in step S30 it is determined that the own-vehicle's steering is not being operated, then in step S40 the distance information acquirer 503 acquires the forward object distance information from the forward-looking monitor 2. The distance indicated by the forward object distance information is referred to as a forward object distance X.

In step S50, the vehicle speed information acquirer 504 acquires the vehicle speed detection signal from the vehicle speed sensor 11. The vehicle speed indicated by the vehicle speed detection signal is hereinafter referred to as an own-vehicle speed V. Further, in step S60, the stopping distance calculator 505 acquires the predicted time to collision information and the required deceleration command from the pre-crash controller 4. The predicted time to collision indicated by the predicted time to collision information is hereinafter referred to as a predicted time to collision t0. The required deceleration indicated by the required deceleration command is hereinafter referred to as a required deceleration A(t0). The required deceleration A(t0) represents a required deceleration at the predicted time to collision t0.

In step S70, the stopping distance calculator 505 calculates an actual deceleration denoted by a. More specifically, the actual deceleration a is calculated according to the following equation (1).

$$a = (Vn - Vn-1)/\Delta T \quad (1)$$

where Vn−1 represents an own-vehicle speed V in the previous cycle (where n is a positive integer), Vn represents an own-vehicle speed V in the current cycle, and ΔT represents a performance period of time of the alert determination processing (in the present embodiment, 32 ms).

In step S80, the stopping distance calculator 505 calculates the stopping distance x according to the following equation (2).

$$x = \int_0^{t_0} \left[ V - \int_0^{t_0} \frac{a}{A(t_0)} A(t)\, dt \right] dt \quad (2)$$

In the equation (2), A(t) represents the required deceleration at predicted time to collision t. A map defining a correspondence relationship between the predicted time to collision and the required deceleration (see FIG. 3) is stored beforehand in the ROM of the alert control apparatus 5. The stopping distance calculator 505 calculates A(t) in the equation (2) with reference to the map.

In step S90, the alert determiner 506 determines whether or not the forward object distance X is less than the stopping distance x. If in step S90 it is determined that the forward object distance X is less than the stopping distance x, then in step S100 the alert controller 507 turns on the headlights 21, the brake lamps 22, and the horn 23, thereby alerting the surroundings of the own vehicle. Thereafter, the process flow ends.

If in step S90 it is determined that the forward object distance X is equal to or greater than the stopping distance x, the process flow proceeds to step S110, where the alert controller 507 turns off the headlights 21 and the brake lamps 22 if the headlights 21 and the brake lamps 22 are illuminating and turns off the horn 23 if the horn 23 is sounding, thereby inhibiting alerting the surroundings of the own vehicle. In step S110, the alert controller 507 takes no action if none of the headlights 21 and the brake lamps 22 are illuminating and if the horn 23 is not sounding. Thereafter, the process flow ends.

The alert control apparatus 5 configured as above determines whether or not the pre-crash control is being performed (in step S10). In the pre-crash control, the brakes of the own vehicle are automatically activated to avoid collision between the own vehicle and a forward object that is an object located forward of the own vehicle during traveling of the own vehicle.

The alert control apparatus 5 is configured to acquire the forward object distance information from the forward-looking monitor 2 (in step S40). The alert control apparatus 5 is configured to acquire the vehicle speed detection signal from the vehicle-speed sensor 11 (in step S50). The alert control apparatus 5 is configured to, if the pre-crash control is being performed, calculate the stopping distance x based on the own-vehicle speed V indicated by the vehicle speed detection signal and the required deceleration A(t) at which the own-vehicle speed V is decreased under the pre-crash control (in step S80). The stopping distance x is a distance the own vehicle travels until the own vehicle stops moving.

The alert control apparatus 5 determines whether or not a predefined alert condition is met. The predefined alert condition is such that, if the condition is met, the collision between the own vehicle and the forward object cannot be avoided. In the present embodiment, the predefined alert condition is that the forward object distance X is less than the stopping distance x (in step S90).

The alert control apparatus 5 is configured to, if the forward object distance X is less than the stopping distance x, activate the headlights 21, the brake lamps 22, and the horn 23 (in step S100). The alert control apparatus 5 is configured to, if the forward object distance X is equal to or greater than the stopping distance x, inhibit operation of the headlights 21, the brake lamps 22, the horn 23 (in step S110).

Therefore, if the alert control apparatus 5 determines that the collision between the own vehicle and the forward object can be avoided taking into account the required deceleration A(t) in the pre-crash control under which the brakes of the own vehicle are activated automatically, the alert control apparatus 5 inhibits operation of the headlights 21, the brake lamps 22, and the horn 23. This can prevent unnecessarily raising the alert even if the collision between the own vehicle and the forward object can be avoided under the pre-crash control.

The pre-crash control is performed such that the brakes of the own vehicle are controlled to decrease the traveling speed of the own vehicle at the required deceleration that is preset as a function of the predicted time to collision TTC. The alert control apparatus 5 is configured to calculate the stopping distance x under the pre-crash control using the required deceleration A(t) over a period of predicted time to collision from a current value t0 to zero. This allows the alert control apparatus 5 to accurately calculate the stopping distance x during performance of the pre-crash control, thereby preventing unnecessarily raising the alert if the collision with the obstacle can be avoided.

The alert control apparatus 5 is configured to, based on the ratio of the actual deceleration a to the required deceleration A (t0) during implementation of the pre-crash control, correct the stopping distance x. The factor a/A(t0) appearing in the equation (2) is the ratio of the actual deceleration a to the required deceleration at time to collision t0. This ratio indicates the slipperiness of the road surface. This configuration allows the alert control apparatus 5 to accurately calculate the stopping distance x taking into account a road surface condition, which can prevent unnecessarily raising the alert.

The alert control apparatus 5 is configured to, if at least either the brakes or the steering is being operated during performance of the pre-crash control, inhibit operation of the headlights 21, the brake lamps 22, and the horn 23 (in steps S20, S30, and S110). This can prevent unnecessarily raising the alert even if the collision between the own vehicle and the forward object can be avoided by the driver voluntarily taking a collision avoidance action. The headlights 21, the brake lamps 22, and the horn 23 are alerting devices.

(Modifications)

It is to be understood that the invention is not to be limited to the specific embodiment disclosed above and that modifications and other embodiments are intended to be included within the scope of the appended claims.

(First Modification)

In the above embodiment, the actual deceleration a is calculated as a rate of change of the own-vehicle speed V with respect to time. In an alternative embodiment where an acceleration sensor mounted on the own vehicle to measure an acceleration of the own vehicle in a traveling direction, the actual deceleration a may be calculated using a detection signal from the acceleration sensor.

(Second Modification)

Figure 3:
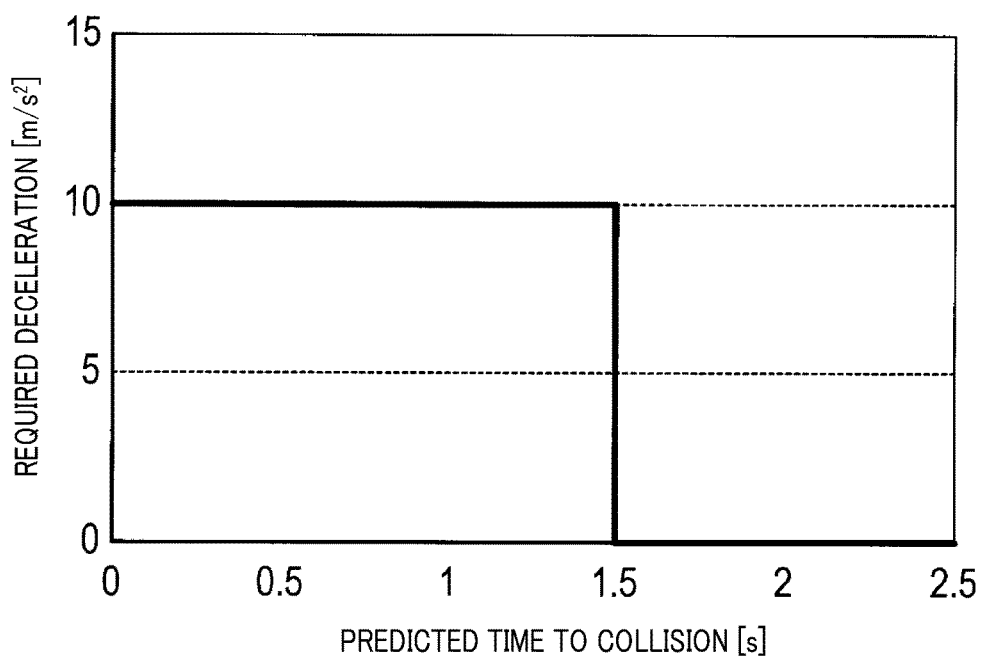
FIG. 3 is a graph illustrating an example of a relationship between predicted time to collision and required deceleration.

In the above embodiment, as shown in FIG. 3, the required deceleration is set to a value of the two-step function of the predicted time to collision. That is, the required deceleration is set to 0 m/s$^2$ or 10 m/s$^2$ depending on the predicted time to collision. Alternatively, the required deceleration may be set to a value of a three-step function of the predicted time to collision. More generally, the required deceleration may be set to a value of a multi-step function of the predicted time to collision. Still alternatively, the required deceleration may be set to a value changing continuously with predicted time to collision.

The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

What is claimed is:

1. An alert control apparatus mounted in a vehicle, comprising:
   an avoidance control determiner configured to determine, using a processor, whether or not collision avoidance control is being performed to automatically activate brakes of the vehicle to avoid collision between the vehicle and a forward object that is an object located forward of the vehicle during traveling of the vehicle, the collision avoidance control being performed such that the brakes of the vehicle are controlled to decrease the traveling speed of the vehicle at a required deceleration that is preset as a function of a predicted time to collision;
   a distance information acquirer configured to acquire, using the processor, a forward object distance information that is information indicative of a distance between the vehicle and the forward object;
   a vehicle speed information acquirer configured to acquire, using the processor, vehicle speed information that is information indicative a traveling speed of the vehicle;
   a stopping distance calculator configured to, if it is determined by the avoidance control determiner that the collision avoidance control is being performed, calculate, using the processor, a stopping distance based on at least the traveling speed of the vehicle indicated by the vehicle speed information acquired by the vehicle speed information acquirer and a collision avoidance deceleration that is a deceleration at which the traveling speed of the vehicle is decreased under the collision avoidance control, the stopping distance being a distance the vehicle travels until the vehicle stops moving;
   an alert determiner configured to, based on at least the distance to the forward object indicated by the forward object distance information acquired by the distance information acquirer and the stopping distance calculated by the stopping distance calculator, determine, using the processor, whether or not a predefined alert condition is met, the predefined alert condition being defined such that, if the condition is met, the collision between the vehicle and the forward object cannot be avoided; and
   an alert controller configured to, if it is determined by the alert determiner that the alert condition is met, activate, using the processor, at least one alerting device operative to alert surroundings of the vehicle, and if it is determined by the alert determiner that the alert condition is not met, inhibit operation of the at least one alerting device.

2. The apparatus of claim 1, wherein
   the stopping distance calculator is configured to calculate the stopping distance using the required deceleration on a period of predicted time to collision from a current value to zero.

3. The apparatus of claim 2, wherein the stopping distance calculator is configured to, based on a ratio of an actual deceleration that is a deceleration at which the traveling speed of the vehicle is actually decreased under the collision avoidance control to the required deceleration, correct the stopping distance.

4. The apparatus of claim 3, wherein the stopping distance is corrected by $$x = \int_0^{t_0} \left[ V - \int_0^{t_0} \frac{a}{A(t_0)} A(t) \, dt \right] dt$$

where $t_0$ represents a current value of predicted time to collision, a represents the actual deceleration, and $A(t)$ represents the required deceleration on the period of predicted time to collision from the current value to zero.

5. The apparatus of claim 1, wherein the alert condition is that the distance between the vehicle and the forward object is less than the stopping distance.

6. The apparatus of claim 1, further comprising an inhibitor configured to, if at least either the brakes or a steering of the vehicle is being operated by a driver of the vehicle during performance of the collision avoidance control, inhibit operation of the at least one alerting device.

7. The apparatus of claim 1, wherein the at least one alerting device comprises headlights, brake lamps, and a horn of the vehicle.

8. A method for alerting surroundings of a vehicle, the computer-executable instructions comprising:
   determining whether or not collision avoidance control is being performed to automatically activate brakes of the vehicle to avoid collision between the vehicle and a forward object that is an object located forward of the vehicle during traveling of the vehicle, the collision avoidance control being performed such that the brakes of the vehicle are controlled to decrease the traveling speed of the vehicle at a required deceleration that is preset as a function of a predicted time to collision;
   acquiring a forward object distance information that is information indicative of a distance between the vehicle and the forward object;
   acquiring vehicle speed information that is information indicative a traveling speed of the vehicle;
   calculating, if it is determined by the avoidance control determiner that the collision avoidance control is being performed, a stopping distance based on at least the traveling speed of the vehicle indicated by the vehicle speed information acquired by the vehicle speed information acquirer and a collision avoidance deceleration that is a deceleration at which the traveling speed of the vehicle is decreased under the collision avoidance control, the stopping distance being a distance the vehicle travels until the vehicle stops moving;
   determining, based on at least the distance to the forward object indicated by the forward object distance information acquired by the distance information acquirer and the stopping distance calculated by the stopping distance calculator, whether or not a predefined alert condition is met, the predefined alert condition being defined such that, if the condition is met, the collision between the vehicle and the forward object cannot be avoided; and
   inhibiting, if it is determined by the alert determiner that the alert condition is met, activate at least one alerting device operative to alert surroundings of the vehicle, and if it is determined by the alert determiner that the alert condition is not met, operation of the at least one alerting device.

9. A non-transitory computer-readable medium having computer-executable instructions for alerting surroundings of a vehicle, the computer-executable instructions comprising:

determining whether or not collision avoidance control is being performed to automatically activate brakes of the vehicle to avoid collision between the vehicle and a forward object that is an object located forward of the vehicle during traveling of the vehicle, the collision avoidance control being performed such that the brakes of the vehicle are controlled to decrease the traveling speed of the vehicle at a required deceleration that is preset as a function of a predicted time to collision;

acquiring a forward object distance information that is information indicative of a distance between the vehicle and the forward object;

acquiring vehicle speed information that is information indicative a traveling speed of the vehicle;

calculating, if it is determined by the avoidance control determiner that the collision avoidance control is being performed, a stopping distance based on at least the traveling speed of the vehicle indicated by the vehicle speed information acquired by the vehicle speed information acquirer and a collision avoidance deceleration that is a deceleration at which the traveling speed of the vehicle is decreased under the collision avoidance control, the stopping distance being a distance the vehicle travels until the vehicle stops moving;

determining, based on at least the distance to the forward object indicated by the forward object distance information acquired by the distance information acquirer and the stopping distance calculated by the stopping distance calculator, whether or not a predefined alert condition is met, the predefined alert condition being defined such that, if the condition is met, the collision between the vehicle and the forward object cannot be avoided; and inhibiting, if it is determined by the alert determiner that the alert condition is met, activate at least one alerting device operative to alert surroundings of the vehicle, and if it is determined by the alert determiner that the alert condition is not met, operation of the at least one alerting device.

* * * * *